(12) United States Patent
Uebelacker

(10) Patent No.: US 10,906,272 B2
(45) Date of Patent: Feb. 2, 2021

(54) LAMINATED VEHICLE-SIDE WINDOW WITH A LEADTHROUGH FOR FASTENING A CLAMPING ELEMENT

(71) Applicant: SAINT-GOBAIN GLASS FRANCE, Courbevoie (FR)

(72) Inventor: Stefan Uebelacker, Aachen (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 0 days.

(21) Appl. No.: 16/464,518

(22) PCT Filed: Nov. 10, 2017

(86) PCT No.: PCT/EP2017/078828
§ 371 (c)(1),
(2) Date: May 28, 2019

(87) PCT Pub. No.: WO2018/099708
PCT Pub. Date: Jun. 7, 2018

(65) Prior Publication Data
US 2019/0322161 A1 Oct. 24, 2019

(30) Foreign Application Priority Data
Nov. 29, 2016 (EP) .................................. 16201027

(51) Int. Cl.
*B32B 17/10* (2006.01)
*B60J 1/00* (2006.01)
(Continued)

(52) U.S. Cl.
CPC ........ *B32B 17/10293* (2013.01); *B32B 3/266* (2013.01); *B60J 1/001* (2013.01);
(Continued)

(58) Field of Classification Search
CPC .... B32B 17/10293; B32B 17/10-1099; B32B 3/266; B60J 1/001; B60J 1/002;
(Continued)

(56) References Cited

U.S. PATENT DOCUMENTS 5,391,411 A * 2/1995 Rowland ........... B32B 17/10917
428/34
5,398,452 A 3/1995 Schilde et al.
(Continued)

FOREIGN PATENT DOCUMENTS

DE 197 10 824 C1 9/1998
EP 0 437 730 A1 7/1991
(Continued)

OTHER PUBLICATIONS

International Search Report as issued in International Patent Application No. PCT/EP2017/078828, dated Feb. 5, 2018.
(Continued)

*Primary Examiner* — Z. Jim Yang
(74) *Attorney, Agent, or Firm* — Pillsbury Winthrop Shaw Pittman LLP

(57) ABSTRACT

A side window for a vehicle, with an upper edge, a lower edge, a front edge, and a rear edge, at least including a first pane and a second pane that are joined to one another via a thermoplastic intermediate layer, wherein the first pane, the second pane, and the thermoplastic intermediate layer each has a hole and wherein the holes of the first pane, of the second pane, and of the thermoplastic intermediate layer are superposed such that a leadthrough for the fastening of a clamping element extends through the entire side window, and wherein the hole of the first pane is larger than the hole of the second pane.

19 Claims, 3 Drawing Sheets

Figure 7:
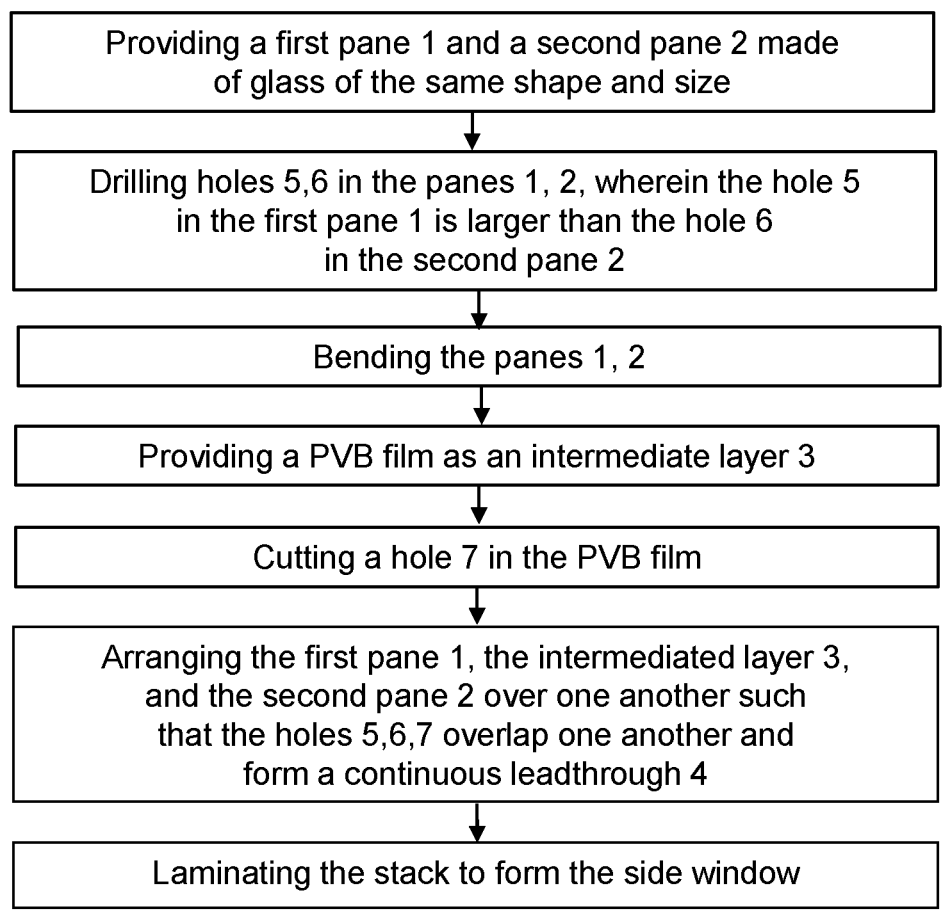

(51) Int. Cl.
*E06B 3/54* (2006.01)
*B32B 3/26* (2006.01)
*B29L 31/00* (2006.01)
*B60J 1/17* (2006.01)

(52) U.S. Cl.
CPC ............ B60J 1/008 (2013.01); E06B 3/5445 (2013.01); *B29L 2031/7782* (2013.01); *B60J 1/17* (2013.01); *E05Y 2900/55* (2013.01); *Y10T 428/24322* (2015.01)

(58) Field of Classification Search
CPC .......... B60J 1/008; B60J 1/02; B60J 1/12–17; Y10T 428/24273–24347; E06B 3/5436; E06B 3/5445
See application file for complete search history.

(56) References Cited

U.S. PATENT DOCUMENTS

| | | | | |
|---|---|---|---|---|
| 6,138,434 | A * | 10/2000 | Demars | E06B 3/66304 52/786.13 |
| 6,467,225 | B1 * | 10/2002 | Shimomura | B60J 1/008 296/146.15 |
| 6,708,595 | B1 * | 3/2004 | Chaussade | B32B 17/10064 89/36.02 |
| 2005/0076572 | A1 | 4/2005 | Cardine et al. | |
| 2006/0005482 | A1 * | 1/2006 | Bennison | B32B 17/10293 52/204.5 |
| 2006/0101737 | A1 * | 5/2006 | Platz | B32B 17/10036 52/204.5 |
| 2007/0190282 | A1 * | 8/2007 | Erban | E06B 3/66342 428/49 |
| 2008/0092464 | A1 | 4/2008 | Haab et al. | |
| 2008/0187721 | A1 * | 8/2008 | Engl | F41H 5/04 428/172 |
| 2010/0059253 | A1 * | 3/2010 | Labrot | B32B 17/10293 174/251 |
| 2010/0300276 | A1 * | 12/2010 | Justamon | B32B 17/10045 89/36.02 |
| 2012/0055094 | A1 | 3/2012 | Iacovoni et al. | |
| 2013/0062119 | A1 | 3/2013 | Schlarb et al. | |
| 2013/0140847 | A1 * | 6/2013 | Altes | B32B 17/10293 296/152 |
| 2014/0234576 | A1 * | 8/2014 | Berard | B32B 17/10293 428/137 |
| 2014/0252808 | A1 * | 9/2014 | Hennion | B32B 17/10091 296/215 |
| 2014/0318058 | A1 * | 10/2014 | Morgan | E04B 2/90 52/235 |
| 2015/0224855 | A1 * | 8/2015 | Legrand | B32B 17/10036 52/204.62 |
| 2015/0236491 | A1 * | 8/2015 | Bureloux | B32B 17/10293 174/650 |
| 2016/0354996 | A1 * | 12/2016 | Alder | B32B 17/10743 |
| 2017/0259531 | A1 * | 9/2017 | Santi | B62D 25/06 |
| 2018/0056759 | A1 * | 3/2018 | Andersson | F41H 5/263 |

FOREIGN PATENT DOCUMENTS

| | | | |
|---|---|---|---|
| EP | 2 418 727 A1 | 2/2012 | |
| EP | 2692979 A1 * | 2/2014 | ............ E04F 13/145 |
| GB | 2 287 743 A | 9/1995 | |
| GB | 2 328 238 A | 2/1999 | |
| JP | H03-279232 A | 12/1991 | |
| JP | H06-323321 A | 11/1994 | |
| JP | 09170280 A * | 6/1997 | ....... B32B 17/10036 |
| JP | 3464523 B2 | 11/2003 | |
| JP | 2009-046353 A | 3/2009 | |
| JP | 2015-527280 A | 9/2015 | |
| JP | 2015-533113 A | 11/2015 | |
| RU | 2011137016 A | 3/2013 | |
| WO | WO 2013/184897 A1 | 12/2013 | |
| WO | WO 2014/191812 A1 | 12/2014 | |

OTHER PUBLICATIONS

Office Action as issued in Korean Patent Application No. 10-2019-7017973, dated Nov. 13, 2020.

Office Action as issued in Colombian Patent Application No. NC2019/0001977, dated Jul. 17, 2020.

Office Action as issued in Indian Patent Application No. 201917001874, dated Nov. 26, 2020.

* cited by examiner

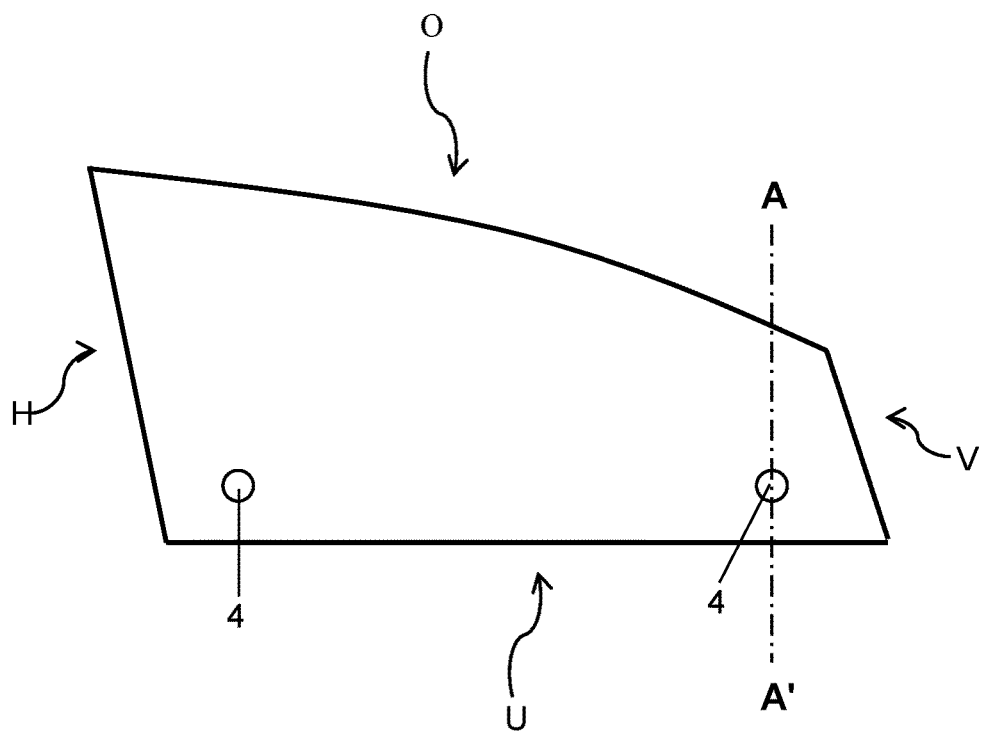
Fig. 1
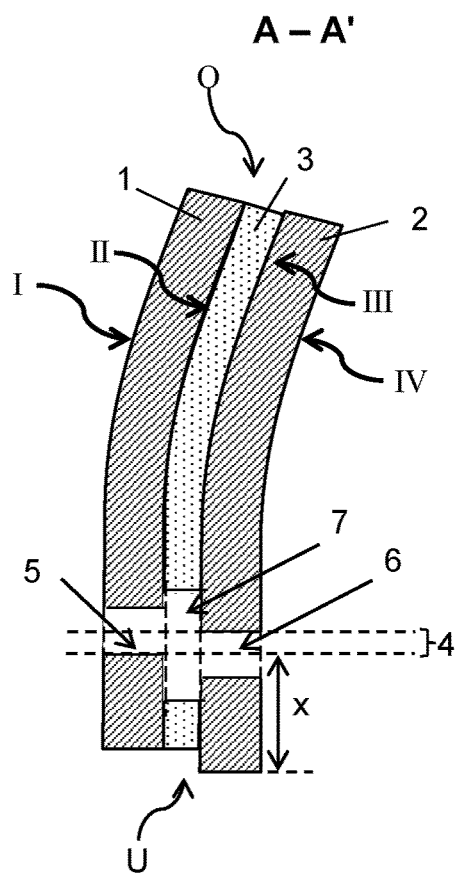
Fig. 2 – Prior Art

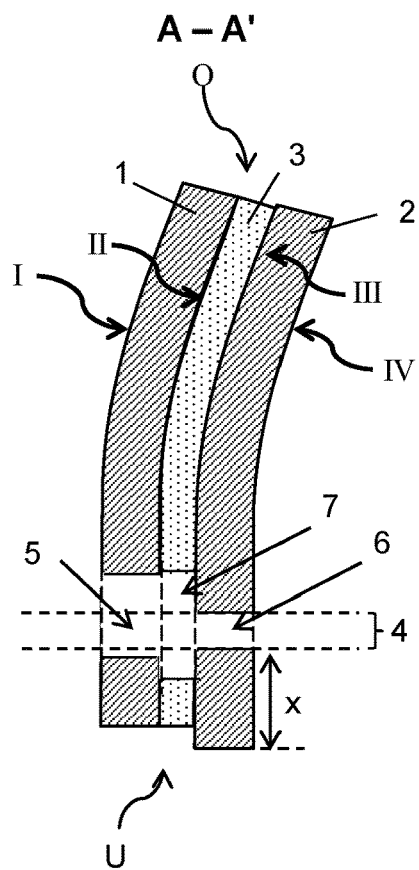
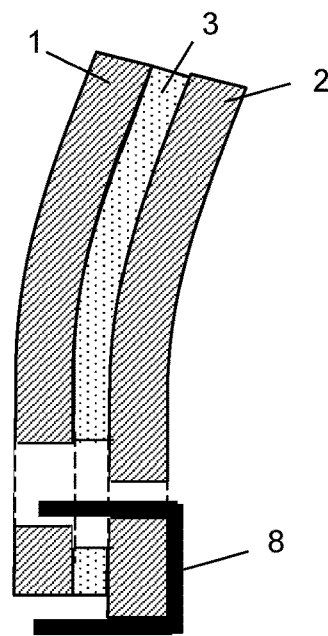
Fig. 3
Fig. 4
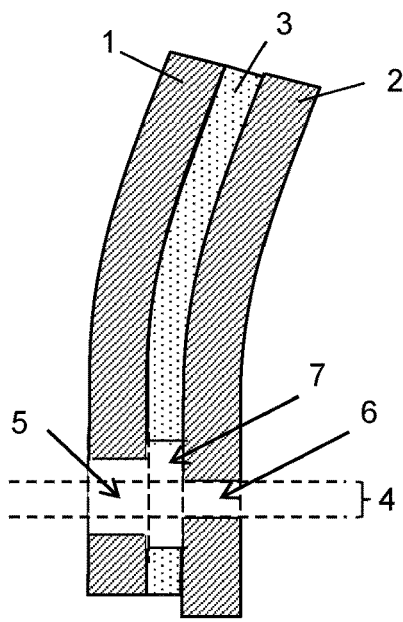
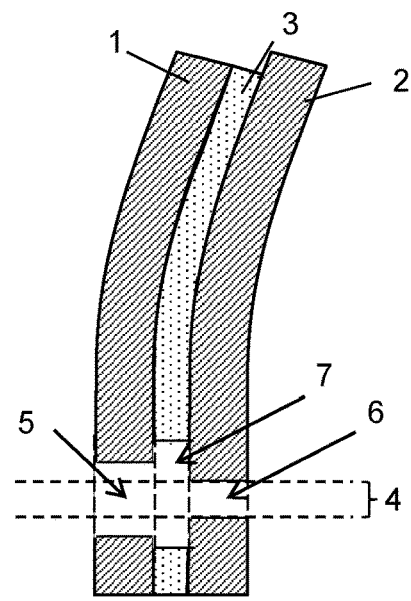
Fig. 5
Fig. 6

LAMINATED VEHICLE-SIDE WINDOW WITH A LEADTHROUGH FOR FASTENING A CLAMPING ELEMENT

CROSS-REFERENCE TO RELATED APPLICATIONS

This application is the U.S. National Stage of PCT/EP2017/078828, filed Nov. 10, 2017, which in turn claims priority to European patent application number 16201027.6 filed Nov. 29, 2016. The content of these applications are incorporated herein by reference in their entireties.

The invention relates to a laminated side window for a vehicle having a fastening hole, a method for the production thereof, as well as the use thereof.

Motor vehicles typically have openable side windows. Such side windows are provided with a side pane that can be moved by substantially vertical displacement, by which means the side window can be opened and closed. In order to be able to move the window, it is connected to a mechanism in the interior of the motor vehicle body.

Side windows of motor vehicles are usually implemented as single pane safety glass (SPSG), are thus made from a single, thermally tempered glass pane. These side windows are typically equipped with one or a plurality of holes in the vicinity of the lower edge, which serve for connection to the displacement mechanism. Such holes are quite simple to produce in an SPSG pane and enable simple and very stable assembly.

However, also increasingly common are side windows that are implemented as composite safety glass (CSG), in particular for motor vehicles of higher price ranges. These side windows are made from two glass panes that are bonded to one another by lamination via a thermoplastic intermediate layer (typically a PVB film). They have a lower weight than SPSG side windows and improve the acoustic comfort in the motor vehicle as well as intrusion safety. Since CSG panes with holes are more difficult to produce and are less stable than is the case with SPSG panes, CSG side panes are conventionally connected to the displacement mechanism by other means: a holder is glued onto the lower edge.

Since the mounting of the side window on the displacement mechanism by means of a hole is preferable, there is demand for laminated side windows with fastening holes. It is difficult to position the holes in the two individual panes precisely one above the other. Manufacturing tolerances can lead to a certain offset between the holes. In particular, however, the curvature of the pane causes a systematic offset in prior art side windows. Typically, two panes of the same size and shape and with holes at the same position are laminated to each other. The alignment of the two panes relative to one another is typically done at the upper edge since it is visible in the opened state and, consequently, should be flush for aesthetic reasons. Since motor vehicle panes are curved, this alignment at the upper edge results in the fact that the lower edge and the hole of the inner pane are displaced downward relative to the lower edge and the hole of the outer pane.

This systematic offset leads to difficulties during assembly of the holder. This is typically a clamping element that is clamped between the lower edge and the leadthrough. The holder is thus fixed in a clamping manner by pressure on the lower edge and the region of the edge of the leadthrough opposite it. As a result of the above-described systematic offset, the distance to be bridged by the clamping element ("clamping distance") is defined by the lower edge of the inner pane and the hole edge of the outer pane. Since the relative arrangement of the outer pane and the inner pane can change as a result of manufacturing tolerances, the clamping distance is not exactly constant in a production series is not precisely constant and reliable, reproducible clamping of the mounting is made difficult.

Since, as a rule, as a result of imperfect alignment, the clamping load is not uniformly distributed on the two panes, but, instead, rests at the upper and lower clamping point on a single pane in each case, the panes are also greatly stressed mechanically. Consequently, there is also a demand for laminated side windows with fastening holes and improved stability.

US 2008/0092464 A1 discloses a composite glass pane with a fastening recess, into which rotatable components each with an eccentrically arranged hole are introduced from both sides. By rotating the components against each other, the holes can be made to coincide such that, independent of any offset of the glass panes, a fastening hole of reproducible shape and size results. However, the fastening system according to US 2008/0092464 A1 is complicated and error-prone due to its multipart design.

DE 197 10 824 C1 discloses a composite glass pane with a fastening hole that can be a vehicle side window. The hole in the outer pane is implemented larger than the hole in the inner pane in order to form a type of circumferential step within the fastening hole. By this means, the connection to a holding element is supposed to be improved by an adhesive compound.

The object of the present invention is to provide an improved vehicle side window with a fastening hole that has high mechanical stability, enables reproducible connection to the displacement mechanism of the vehicle body, and is producible in a simple manner.

The object of the present invention is accomplished according to the invention by a side window in accordance with claim 1. Preferred embodiments are apparent from the dependent claims.

The side window is provided as a vehicle side window for separating a vehicle interior from outer surroundings. The two panes can, consequently, also be referred to as the "outer pane" and the "inner pane". The term "inner pane" refers to that pane that faces the interior in the installation position. "Outer pane" refers to that pane that faces the outer surroundings in the installation position.

The side window also has an upper edge, a lower edge, a front edge, and a rear edge. "Upper edge" refers to the side edge of the side window that points upward in the installation position. "Lower edge" refers to the side edge that points downward toward the ground in the installation position. "Front edge" refers to the side edge that is oriented forward in the driving direction. "Rear edge" refers to the side edge that is oriented backward in the driving direction.

The side window according to the invention comprises at least one first pane and one second pane that are bonded to one another via a thermoplastic intermediate layer. It is thus implemented as a laminated pane or a composite glass pane. The side window according to the invention has at least one leadthrough. The leadthrough serves as a fastening hole, in particular to connect the side window to the displacement mechanism of a vehicle body, typically the raising and lowering mechanism arranged in the side door.

The leadthrough is formed in that the first pane, the second pane, and the thermoplastic intermediate layer have in each case a hole, wherein said holes overlap one another completely or at least partially. They are superposed such that a leadthrough that is formed by the overlapping regions of the holes extends through the entire side window.

The leadthrough is provided for and suitable for fastening a clamping element. The clamping element is clamped on in particular between the lead through and the lower edge. This means that the clamping element is, on one side, introduced into the fastening hole and, on the other side, the lower edge of the side window is at least partially covered such that mechanical pressure is exerted on the lower edge by the clamping element, on the one hand, and on the region of the side edge of the leadthrough opposite it, on the other. The clamping element is fixed on the side window by these mutually opposing forces. The clamping connection can, to be sure, be bolstered, for example, by an adhesive; however, the leadthrough is, in particular, not completely filled with an adhesive compound.

Prior art laminated side windows are made of two glass panes that have substantially the same shape and the same dimensions and that are provided with holes of the same size at the same position. Side windows are also bent (convexly, relative to the vehicle interior) and and are aligned with each other at the upper edge during lamination, i.e., arranged relative to one another such that the upper edges are substantially flush. This is supposed to improve the appearance of the side window since the upper edge is visible in the opened state of the window. The curvature of the pane results in the fact that the lower edge as well as the hole of the inner pane is displaced downward relative to the lower edge and the hole of the outer pane. The holes are offset relative to one another and the remaining leadthrough through the composite glass is smaller than the holes of the individual panes. The side windows are provided with a holder that serves for connecting to the lifting mechanism of the vehicle body, typically within the vehicle door. For this purpose, clamping elements are typically used as holders that bridge the region between the leadthrough and the lower edge, in other words, are clamped on between the leadthrough and the lower edge. The clamping element exerts mutually opposing forces on the lower edge, on the one hand, and on the region of the side edge of the lead through opposite the lower edge, on the other. Since the panes are offset relative to one another in the lower region, the force is absorbed only by the respective protruding pane. In the above-described prior art case, this is the lower edge of the inner pane and the region of the side edge of the hole of the outer pane opposite it. These dictate the clamping distance, which refers, in the context of the invention, to the distance between the force-absorbing surfaces, i.e., the distance to be bridged by the clamping element. Since both individual panes of prior art laminated side windows influence the clamping distance, but they are not absolutely consistent due to manufacturing tolerances within a production series, a variation in clamping distances occurs and the clamping element cannot be reliably secured in part of the production series (when the clamping distance is too small) or not even attached at all (when the clamping distance is too large).

According to the invention, this problem is solved in that the holes of the two individual panes are implemented with a different size. The side window is preferably curved, in particular such that the surface of the first pane facing away from the intermediate layer is curved convexly and the surface of the second pane facing away from the intermediate layer is curved concavely. The lower edge of the second pane then protrudes beyond the lower edge of the first pane. According to the invention, the hole of the first pane is larger than the hole of the second pane. Thus, despite the relative displacement, the region of the side edge of the hole of the second pane opposite the lower edge protrudes beyond that of the first pane. The clamping distance is then dictated by the lower edge of the second pane and the region of the side edge of the hole of the second pane opposite it. The clamping distance then depends only on the second pane and is no longer subject to the manufacturing tolerances in terms of the relative arrangement of the panes. The clamping distance is, consequently, substantially consistent within a production series (dependent only on the tolerances in the positioning of the hole of the second pane); and the reliability of the clamping element is improved. This is the major advantage of the invention.

Since vehicle windows are usually curved such that the surface of the outer pane facing away from the intermediate layer is convex and the surface of the inner pane facing away from the intermediate layer is concave, in a preferred embodiment, the first pane is the outer pane and the second pane is the inner pane. The clamping distance is then dependent only on the inner pane. The term "exterior-side surface" of a pane refers to that surface that faces the outer surroundings in the installation position. "Interior-side surface" refers to that surface that faces the interior in the installation position. Therefore, in the composite glass, the interior-side surface of the outer pane and the exterior-side surface of the inner pane are bonded to one another via the intermediate layer. It is customary to refer to the exterior-side surface of the outer pane as side I, the interior-side surface of the outer pane as side II, the exterior-side surface of the inner pane as side III, and the interior-side surface of the inner pane as side IV.

The side window according to the invention is preferably an openable side window of a motor vehicle, in particular of a passenger car. This means a pane for a side window that can be opened and closed again by substantially vertical displacement of the side window into the car body. Typically, such side windows have a plurality of, in particular two leadthroughs. The leadthrough or leadthroughs are arranged in the region of the lower edge, where they are hidden in the vehicle body in the opened and also in the closed state of the window. The leadthrough is provided for connecting to a lifting mechanism arranged in the vehicle body, in order to fasten the pane, in particular by introducing a fastening section of the lifting mechanism, for example, a fastening pin, into the leadthrough. Thus, complicated holders installed at the lower edge of the side window, which have, until now, been used for laminated side windows, can be dispensed with.

Each leadthrough usually has a distance from the lower edge of at most 50 mm, in particular from 10 mm to 30 mm. The size of the leadthrough is usually at least 20 $mm^2$, in particular from 20 $mm^2$ to 2000 $mm^2$, preferably from 80 $mm^2$ to 700 $mm^2$. The leadthrough is ideally roughly circular with a diameter from from 5 mm to 50 mm, preferably from 10 mm to 30 mm.

In the context of the invention, the expression "distance of a leadthrough or of a hole from a side edge" always means the distance (the length of the shortest connecting path) of the side edge in question from the geometric center of the leadthrough or of the hole. For example, in the case of a circular hole, the distance between the center of the circle and the side edge is to be used.

The holes in the first and the second pane are usually substantially circular, with most prior art fastening systems being designed for this. However, depending on the requirements in the individual case, the holes can also have any other shape, for example, an elliptical shape, or even an irregular shape. The size of a hole is customarily at least 20 $mm^2$, in particular from 80 $mm^2$ to 700 $mm^2$. In the case of a circular hole, the diameter is preferably at least 5 mm, in particular from 10 mm to 30 mm.

The necessary size difference of the holes of the first and of the second pane also depends on the curvature of the pane and the size of the pane. In the case of the curved composite pane, the point of the side edge of the hole of the second pane with the smallest distance from the lower edge should protrude beyond the point of the side edge of the first pane with the smallest distance from the lower edge—in other words, protrude beyond it into the leadthrough. Simply stated, the lower region of the hole of the first pane sits lower than that of the hole of the second pane. The size difference selected should be adequate to ensure this with a given curvature and size of the pane.

In a preferred embodiment, the area of the hole of the first pane is greater by at least 10% than the area of the hole of the second pane, particularly preferably by at least 20%. In the case of circular holes, the diameter of the hole of the first pane is greater by at least 5% than the diameter of the hole of the second pane, particularly preferably by at least 10%. With typical hole sizes, the diameter of the hole of the first pane should be at least 1 mm greater than the diameter of the hole of the second pane.

In an advantageous embodiment, the first pane and the second pane are aligned with one another at the upper edge, i.e., arranged substantially flush. This is customary with laminated side windows and is advantageous in terms of an aesthetic appearance of the upper edge, which is visible in the opened state. The hole of the first pane preferably has a smaller distance from the lower edge than the hole of the second pane. The hole of the first pane is, therefore, offset somewhat downward compared to the hole of the second pane. As a result, the systematic offset that is produced by the bending of the pane is at least partially compensated and the size difference between the holes of the two panes can be selected smaller.

In an alternative advantageous embodiment, the first pane and the second pane are aligned with one another at the lower edge, i.e., arranged substantially flush. Since the holes are arranged in the vicinity of the lower edge, the systematic offset due to the curvature of the pane is reduced, as a result of which the size difference between the holes of the two panes can be selected smaller. This is, to be sure, accompanied by an offset on the visible upper edge, which can, however, be acceptable and put up with in the individual case. The holes of the first and the second pane can then have substantially the same distance from the lower edge, as is also customary with prior art laminated side windows.

In an advantageous improvement of the side window, the hole of the intermediate layer is smaller than the holes in the first pane and in the second pane, has, in particular, a smaller diameter. Consequently, during the arrangement of the layer stack prior to lamination, the thermoplastic film, which later forms the intermediate layer, protrudes somewhat into the region of the holes in the panes. During lamination the thermoplastic material flows over the side edges of the leadthrough, thus protecting it. In this manner, the mechanical stability of the side window can be improved.

Depending on the holder system used, thermoplastic material in the leadthrough can, however, also be disruptive for the mounting of the holder. Consequently, in an alternative preferred improvement, the hole of the intermediate layer is larger than the holes in the first pane and in the second pane, has, in particular, a larger diameter. The side edge of the hole of the intermediate layer is thus set back relative to that of the holes of the panes, and the leadthrough remains free of thermoplastic material, making the mounting of the holder simpler and more reliable.

In an advantageous embodiment, the first pane and/or the second pane has, on its respective hole, an edge compressive stress of at least 20 MPa, preferably at least 30 MPa. The edge compressive stress is measured at the side edge in the respective hole using methods known per se to the person skilled in the art. A suitable analysis instrument is, for example, the Edge Stress Master from the company Sharpies Stress Engineers Ltd. The edge compressive stress can be influenced, for example, by the cooling rate at the hole after the bending of the pane. In the range indicated, the side window is particularly susceptible to mechanical loading in the region of the leadthrough, with the values indicated preferably applying to both individual panes.

In a preferred embodiment, the first pane and/or the second pane has a surface tension of at least 20 MPa, particularly preferably at least 30 MPa, most particularly preferably at least 40 MPa. The surface tension is likewise a compressive stress that can be influenced by the cooling rate after the bending of the pane. Suitable measuring instrument are, for example, GASP® Polarimeter from the company Strainoptics, Inc. High mechanical stability is ensured by the preferred stress values, with the values indicated preferably applying to both individual panes.

During the drilling of holes in glass panes, so-called "shells" inevitably occur at the drilling edge. These defects are frequently also called "flakes" or "chips". The inventors have found that the size of the shells has a substantial influence on the mechanical load-bearing capacity of the leadthrough. The size of the shells (chip size) should be at most 750 μm, preferably at most 500 μm, and particularly preferably at most 300 μm. "Size" refers to the length of the shell along its most extensive dimension. It can be influenced by suitable measures during to drilling of the holes, for example, by the drill head used, the rotation speed, or the penetration speed during drilling.

The first pane and the second pane preferably contain glass, in particular soda lime glass. The thickness of the panes can vary widely and thus be ideally adapted to the requirements in the individual case. Preferably, the thicknesses of the first and the second pane are from 0.5 to 10 mm and preferably from 1 mm to 5 mm, most particularly preferably from 1.1 mm to 2.6 mm.

The thermoplastic intermediate layer is formed by at least one thermoplastic film. The thermoplastic film contains at least one thermoplastic polymer, preferably ethylene vinyl acetate (EVA), polyvinyl butyral (PVB), or polyurethane (PU) or mixtures or copolymers or derivatives thereof, particularly preferably PVB. The thickness of the thermoplastic bonding film is preferably from 0.2 mm to 2 mm, particularly preferably from 0.3 mm to 1 mm, for example, 0.38 mm or 0.76 mm. The intermediate layer can also be made of a so-called "acoustic film", which has a noise-damping effect. Such films are typically made of at least three plies, wherein the middle ply has higher plasticity or elasticity than the outer layers surrounding it, for example, as a result of a different plasticizer content.

The first pane, the second pane, or the intermediate layer can be clear and colorless, but can also be tinted, frosted, or colored.

The invention also includes a laminated side window according to the invention with a holder fastened in the leadthrough. The holder is preferably a clamping element that is clamped on between the leadthrough and the lower edge. The clamping element preferably exerts its clamping force directly on the side edge of the leadthrough, without other solid, rigid elements being arranged in the leadthrough between the side edge and the clamping element, such as compensation elements or edge seals. The clamping element is thus preferably clamped directly onto the panes. However, flexible elements, for example, an adhesive or the thermoplastic material of the intermediate layer can be arranged between the clamping element and the side edge of the leadthrough.

The invention also includes an assembly comprising a vehicle body with a lifting mechanism for an openable side window arranged therein and a side window according to the invention that is joined to the lifting mechanism via a holder in the leadthrough.

The invention moreover includes a method for producing a side window having a continuous fastening hole, wherein:
(a) a first pane, a second pane, and a thermoplastic intermediate layer are each provided with a hole, wherein the hole of the first pane is larger than the hole of the second pane,
(b) the first pane, the thermoplastic intermediate layer, and the second pane are arranged areally one atop another in this order to form a stack, wherein said holes are superposed such that a leadthrough extends through the entire stack,
(c) the first pane is joined to the second pane via the intermediate layer by lamination.

The holes in the individual panes are produced by drilling or other methods known per se to the person skilled in the art. The hole in the intermediate layer is preferably produced by cutting or punching.

The individual panes are preferably bent prior to lamination, with all bending methods customary in the art being suitable. The bending preferably occurs only after the production of the holes in the individual panes because flat panes are easier to provide with holes.

The production of the composite glass by lamination is done with customary methods known per se to the person skilled in the art, for example, autoclave methods, vacuum bag methods, vacuum ring methods, calender methods, vacuum laminators, or combinations thereof. The joining of the first and the second pane is usually done under the action of heat, vacuum, and/or pressure.

The invention moreover includes the use of a side window according to the invention as an openable side window of a motor vehicle, preferably a passenger car, wherein the leadthrough serves for fastening to a lifting mechanism in the vehicle body.

in the following, the invention is explained in detail with reference to drawings and exemplary embodiments. The drawings are a schematic representation and not to scale. The drawings in no way restrict the invention. In particular, the pane thicknesses and the size of the holes are depicted significantly enlarged to better illustrate the principle according to the invention.

They depict:

FIG. 1 a plan view of an embodiment of the side window according to the invention, FIG. 2 a section a section along A-A through a prior art side window FIG. 3 a section along A-A through an embodiment of the side window according to the invention of FIG. 1, FIG. 4 the side window of FIG. 3 with an inserted clamping element, FIG. 5 a section along A-A through another embodiment of the side window, FIG. 6 a section along A-A through another embodiment of the side window FIG. 7 a flowchart of an embodiment of the method according to the invention.

FIG. 1 depicts a plan view of a laminated side window that is provided as an openable side window for the front side window of a passenger car. The side window has, in the vicinity of the lower edge U, two leadthroughs 4 that are provided as fastening holes for connecting to a lifting mechanism in the vehicle body.

FIG. 2 depicts a cross-section through a prior art generic laminated side window. It is constructed from a first pane 1 and a second pane 2, joined by a thermoplastic intermediate layer 3. The two panes 1, 2 are made, for example, of soda lime glass and have a thickness in each case of 2.1 mm. The intermediate layer 3 is formed, for example, by a PVB film with a thickness of 0.76 mm. Each pane 1, 2 as well as the intermediate layer 3 has a hole 5, 6, 7, the superposing of which forms the leadthrough 4.

The first pane 1 forms the outer pane; the second pane 2, the inner pane of the side window. The side window is curved such that the exterior-side surface I of the outer pane 1 is curved convexly and the interior-side surface IV of the inner pane 2 is curved concavely. The surfaces II, III facing one another of the panes 1, 2 are joined to one another via the intermediate layer 3. The two panes 1, 2 are arranged atop one another and aligned such that the upper edge O is substantially flush. The two panes panes 1, 2 have the same shape and size, with holes 5, 6 of the same size at the same position. The superposing of the two holes 5, 6 is negatively affected by the curvature of the panes and the alignment at the upper edge O: The hole 6 of the inner pane 2 sits somewhat lower than the hole 5 of the outer pane 1. Thus, the remaining leadthrough 4, which emerges, so to speak, as an intersection of the two holes 5, 6 in the projection on one another, is reduced relative to the individual holes 5, 6.

The leadthrough 4 is provided for the fastening of a holder that is clamped on as a clamping element between the leadthrough 4 and the lower edge U. The distance between the surfaces protruding the farthest on both sides is the clamping distance x—in other words, the distance that must be bridged by the clamping element. As is discernible from the figure, the clamping distance x is dictated
    on the one hand, by the lower region of the side edge of the hole 5 of the outer pane 1 and
    on the other, by the lower edge U of the inner pane 2.

Due to manufacturing tolerances, the positioning of the panes 1, 2 on one another, and thus the clamping distance x as well, is subject to certain variation. This variation with regard to the clamping distance x makes reliable mounting of the clamping holders in a production series more difficult.

FIG. 3 depicts a cross-section through a laminated side window according to the invention. Here, the hole 5 of the outer pane 1 is implemented larger than the hole 6 of the inner pane 2. For example, both holes 5, 6 are circular, with the hole 5 of outer pane 1 having a diameter of 16 mm and the hole 6 of the inner pane 2 having a diameter of 14 mm. The two holes 5, 6 (more precisely, the center of the holes 5, 6) have, here as well, the same distance from their respective lower edge U. The two panes 1, 2 are aligned substantially flush at the upper edge O.

As a result of the larger diameter of the hole 5 of the outer pane 1, the lower region of the side edge of the hole 5 is arranged lower than the corresponding region of the side edge of the hole 6 of the inner pane 2. The clamping distance x thus depends only on the inner pane 2, namely on its hole 6 and on its lower edge U. The production-related variation with regard to the clamping distance x is thus significantly reduced. The size of the leadthrough 4 corresponds to the size of the hole 6 of the inner pane 2, which is arranged, in the example depicted, completely within the hole 5 of the outer pane 1 (based on the projection onto one another).

FIG. 4 depicts the side window of FIG. 3 with a mounted clamping element 8. The clamping element 8 is made of plastic and is clamped on between the lower edge U and the leadthrough 4. It serves as a holder to connect the side window to the lifting mechanism in the side door of a passenger car. By means of the design according to the invention of the holes 5, 6 of the panes 1, 2, the regions of the lower edge U and of the leadthrough 4, which absorb the clamping pressure of the clamping element 8, are provided only by the inner pane 2.

FIG. 5 depicts a cross-section through another embodiment of the side window according to the invention. In contrast to the embodiment of FIG. 3, the hole 6 has a smaller distance from the lower edge of the outer pane 1 than the hole 5 from the lower edge of the inner pane 2 (measured in each case from the center of the hole). The hole 6 is thus offset even farther downward relative to the hole 5. As a result, the hole 5 of the outer pane 1 can be implemented smaller, nevertheless ensuring that its lower region does not protrude beyond that of the hole 6 of the inner pane 2. The superposing of the holes 5, 6 is further improved.

FIG. 6 depicts a cross-section through another embodiment of the side window according to the invention. As in the embodiment of FIG. 3, the holes 5, 6 of the two panes 1, 2 have the same distance from the respective lower edge U. The two panes 1, 2 are, however, arranged on one another and aligned such that the lower edge U is substantially flush. Since the leadthroughs 4 are arranged in the vicinity of the lower edge U, the displacement of the holes 5, 6 relative to one another as a result of the curvature of the pane is reduced and their superposing is improved. Thus, the hole 5 of the outer pane 1 can be implemented smaller. The systematic offset that develops at the upper edge O, favouring better superposing of the holes 5, 6, is acceptable.

In the embodiments depicted, the hole 7 of the intermediate layer 3 is in each case implemented larger than the holes 5, 6 of the panes 1, 2. The leadthrough 4 thus remains free of thermoplastic material and the mounting of the clamping element 8 is not disrupted. Depending on the clamping element 8 used, it can, however, also be desirable to protect the side edge of the leadthrough 4 with thermoplastic material. Consequently, in alternative embodiments, the hole 7 can be implemented smaller than the holes 5, 6 of the panes 1, 2, such that thermoplastic material of the intermediate layer 3 spreads in the leadthrough 4.

FIG. 7 depicts a flowchart of an exemplary embodiment of the method according to the invention for producing a laminated side window according to the invention.

LIST OF REFERENCE CHARACTERS (1) first pane/outer pane
(2) second pane/inner pane
(3) thermoplastic intermediate layer
(4) leadthrough in the side window
(5) hole in the outer pane 1
(6) hole in the inner pane 2
(7) hole in the intermediate layer 3
(8) clamping element
(x) clamping distance of the side window
(O) upper edge
(U) lower edge
(V) front edge
(H) rear edge I exterior-side surface of the outer pane 1
II interior-side surface of the outer pane 1
III exterior-side surface of the inner pane 2
IV interior-side surface of the inner pane 2
A-A' section line

The invention claimed is:

1. A side window for a vehicle, with an upper edge, a lower edge, a front edge, and a rear edge, comprising a first pane and a second pane that are joined to one another via a thermoplastic intermediate layer,
    wherein the first pane, the second pane, and the thermoplastic intermediate layer each has a hole,
    wherein the holes of the first pane, of the second pane, and of the thermoplastic intermediate layer are superposed such that a leadthrough for the fastening of a clamping element extends through the entire side window,
    wherein the hole of the first pane is larger than the hole of the second pane, and wherein a clamping element is clamped on between the leadthrough and the lower edge, the clamping element including a first portion that is positioned inside the leadthrough and a second portion that is positioned outside the leadthrough and that rests against at least a portion of the lower edge such that a mechanical pressure is exerted by the clamping element on the lower edge and on a region of a side edge of the leadthrough.

2. The side window according to claim 1, which is bent such that a surface of the first pane facing away from the intermediate layer is convexly curved and a surface of the second pane facing away from the intermediate layer is concavely curved.

3. The side window according to claim 1, wherein a point of a side edge of the hole of the second pane with the smallest distance from the lower edge is above a point of a side edge of the hole of the first pane with the smallest distance from the lower edge.

4. The side window according to claim 1, wherein an area of the hole of the first pane is greater by at least 10% than an area of the hole of the second pane.

5. The side window according to claim 1, wherein the first pane is the outer pane and the second pane is the inner pane of the side window.

6. The side window according to claim 5, wherein the first pane and the second pane are arranged flush at the upper edge and the hole of the first pane has a smaller distance from the lower edge than the hole of the second pane.

7. The side window according to claim 1, wherein the first pane and the second pane are arranged flush at the lower edge and the holes of the first pane and of the second pane are located at an equal distance from the lower edge.

8. The side window according to claim 1, wherein the hole of the intermediate layer is larger than the holes in the first pane and the second pane.

9. The side window according to claim 1, wherein the hole of the intermediate layer is smaller than the holes in the first pane and the second pane.

10. The side window according to claim 1, wherein the first pane and/or the second pane has, at the respective hole, an edge compressive stress of at least 20 MPa.

11. The side window according to claim 1, wherein the first pane and/or the second pane has surface tension of at least 20 MPa.

12. The side window according to claim 1, wherein shells at edges of the holes of the first pane and of the second pane have a size of at most 750 µm.

13. The side window according to claim 10, wherein the edge compressive stress is of at least 30 MPa.

14. The side window according to claim 11, wherein the surface tension is of at least 30 MPa.

15. The side window according to claim 14, wherein the surface tension is of at least 40 MPa.

16. The side window according to claim 12, wherein the size is of at most 500 μm.

17. A method for producing a side window having a continuous fastening hole, comprising:
   providing a first pane, a second pane, and a thermoplastic intermediate layer with, in each case, a hole, wherein the hole of the first pane is larger than the hole of the second pane,
   arranging the first pane, the thermoplastic intermediate layer, and the second pane areally one atop another to form a stack, wherein said holes are superposed such that a leadthrough extends through the entire stack,
   joining the first pane to the second pane via the intermediate layer by lamination, and
   clamping a clamping element between the leadthrough and a lower edge of the side window, the clamping element including a first portion that is positioned inside the leadthrough and a second portion that is positioned outside the leadthrough and that rests against at least a portion of the lower edge such that a mechanical pressure is exerted by the clamping element on the lower edge and on a region of a side edge of the leadthrough.

18. A method comprising utilizing a side window according to claim 1 as an openable side window of a motor vehicle.

19. The method according to claim 18, wherein the motor vehicle is a passenger car.

* * * * *